United States Patent
Hamada et al.

(10) Patent No.: US 9,927,893 B2
(45) Date of Patent: Mar. 27, 2018

(54) GLASS FILM LAMINATE FOR TOUCH PANEL, TOUCH PANEL, AND METHOD OF MANUFACTURING GLASS FILM LAMINATE FOR TOUCH PANEL

(71) Applicant: Nippon Electric Glass Co., Ltd., Shiga (JP)

(72) Inventors: Seiji Hamada, Shiga (JP); Hiroyuki Uchida, Shiga (JP); Hiroaki Tanaka, Shiga (JP); Michiharu Eta, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 124 days.

(21) Appl. No.: 14/429,103

(22) PCT Filed: Sep. 25, 2013

(86) PCT No.: PCT/JP2013/075887
§ 371 (c)(1),
(2) Date: Mar. 18, 2015

(87) PCT Pub. No.: WO2014/054484
PCT Pub. Date: Apr. 10, 2014

(65) Prior Publication Data
US 2015/0253914 A1 Sep. 10, 2015

(30) Foreign Application Priority Data
Oct. 5, 2012 (JP) .................................. 2012-222621

(51) Int. Cl.
*G06F 3/0488* (2013.01)
*G06F 3/041* (2006.01)
(Continued)

(52) U.S. Cl.
CPC .............. *G06F 3/0412* (2013.01); *B32B 3/28* (2013.01); *B32B 7/12* (2013.01); *B32B 17/064* (2013.01);
(Continued)

(58) Field of Classification Search
CPC ..... G06F 3/0488; G06F 3/04883; G06F 3/044
See application file for complete search history.

(56) References Cited

U.S. PATENT DOCUMENTS

2003/0122792 A1* 7/2003 Yamamoto .......... G06F 3/03547
345/173
2009/0122021 A1* 5/2009 Liu ..................... G02F 1/13338
345/173
(Continued)

FOREIGN PATENT DOCUMENTS

| CN | 102066110 | 5/2011 |
| JP | 2006-018417 | 1/2006 |

(Continued)

OTHER PUBLICATIONS

Office Action dated Sep. 13, 2016 in corresponding Taiwanese Patent Application No. 102135463 (partial English Translation).
(Continued)

*Primary Examiner* — Alexander Eisen
*Assistant Examiner* — Mansour M Said
(74) *Attorney, Agent, or Firm* — Wenderoth, Lind & Ponack, L.L.P.

(57) ABSTRACT

A glass film laminate (1) for a touch panel includes a glass film (2), a glass film (3), a glass film (4), and transparent adhesive layers (5). The glass films (2), (4) form both outermost layers. The glass film (3) has a transparent conductive layer (6) formed on each of both surfaces thereof. The glass films (2), (3), (4) each have a thickness of 200 μm or less. The glass film laminate (1) for a touch panel itself
(Continued)

assumes a curved state without the application of an external force, in which a curved concave surface (21) and a curved convex surface (41) are formed. The curved concave surface (21) has formed therein a compressive stress, and the curved convex surface (41) has formed therein a tensile stress.

5 Claims, 3 Drawing Sheets

(51) Int. Cl.
| | |
|---|---|
| *B32B 3/28* | (2006.01) |
| *B32B 7/12* | (2006.01) |
| *B32B 17/06* | (2006.01) |
| *B32B 37/12* | (2006.01) |
| *B32B 38/00* | (2006.01) |
| *B32B 38/18* | (2006.01) |
| *G06F 1/16* | (2006.01) |

(52) U.S. Cl.
CPC .......... *B32B 37/12* (2013.01); *B32B 38/0036* (2013.01); *B32B 38/1866* (2013.01); *G06F 1/16* (2013.01); *G06F 3/041* (2013.01); *B32B 2307/412* (2013.01); *B32B 2457/208* (2013.01); *G06F 2203/04102* (2013.01); *G06F 2203/04103* (2013.01); *G06F 2203/04107* (2013.01); *Y10T 428/24628* (2015.01)

(56) References Cited

U.S. PATENT DOCUMENTS

| | | | |
|---|---|---|---|
| 2009/0277578 A1 | 11/2009 | Sung et al. | |
| 2009/0284904 A1 | 11/2009 | Wu et al. | |
| 2010/0119846 A1 | 5/2010 | Sawada | |
| 2010/0282416 A1 | 11/2010 | Sung et al. | |
| 2010/0321334 A1* | 12/2010 | Oda | G06F 3/044 345/174 |
| 2011/0123787 A1 | 5/2011 | Tomamoto et al. | |
| 2011/0187672 A1* | 8/2011 | Hung | G06F 3/044 345/174 |
| 2011/0279400 A1 | 11/2011 | Yilmaz | |
| 2012/0098788 A1* | 4/2012 | Sekiguchi | G06F 3/044 345/174 |
| 2012/0111479 A1* | 5/2012 | Sung | B32B 17/10174 156/102 |
| 2012/0211148 A1 | 8/2012 | Sung et al. | |
| 2012/0298497 A1 | 11/2012 | Maeda et al. | |
| 2013/0164483 A1 | 6/2013 | Cites et al. | |
| 2013/0199241 A1 | 8/2013 | Sawada | |
| 2013/0270098 A1 | 10/2013 | Maeda et al. | |
| 2013/0295337 A1* | 11/2013 | Busman | G02F 1/1303 428/174 |
| 2014/0016043 A1* | 1/2014 | Chen | G06F 3/041 349/12 |

FOREIGN PATENT DOCUMENTS

| | | |
|---|---|---|
| JP | 2011-184284 | 9/2011 |
| JP | 2012-25661 | 2/2012 |
| JP | 2012-133428 | 7/2012 |
| TW | 200949775 | 12/2009 |
| TW | 201203327 | 1/2012 |
| TW | 201205400 | 2/2012 |
| WO | 2011/155403 | 12/2011 |
| WO | 2012/037094 | 3/2012 |

OTHER PUBLICATIONS

English translation of International Preliminary Report on Patentability and Written Opinion dated Apr. 7, 2015 in PCT/JP2013/075887.

International Search Report dated Jan. 7, 2014 in International (PCT) Application No. PCT/JP2013/075887.

Office Action dated Jun. 1, 2016 in Japanese patent application No. 2012-222621 (with English translation).

* cited by examiner

GLASS FILM LAMINATE FOR TOUCH PANEL, TOUCH PANEL, AND METHOD OF MANUFACTURING GLASS FILM LAMINATE FOR TOUCH PANEL

TECHNICAL FIELD

The present invention relates to a touch panel to be used for a mobile phone, a smartphone, a tablet or notebook PC, a car navigation system, an ATM in a bank, a ticket vending machine, or the like, and to a glass film laminate to be used for the touch panel.

BACKGROUND ART

A touch panel has heretofore been used for ATMs in banks, game machines in video arcades, and ticket vending machines for trains, buses, and the like. When the touch panel is produced by mounting a touch sensor in a display device, it is possible, by virtue of the construction of the touch panel, to intuitively operate the machine through visual perception of information displayed on the display device. Therefore, the device mounted with the touch panel has an advantage in that the device can be easily operated.

In addition, the touch panel enables mounting of an input device in a display device, and hence obviates the need to separately provide an input device, thus enabling downsizing and light-weighting of the entire device. Therefore, in recent years, the touch panel has been suitably used for mobile phones, smartphones, portable game consoles, tablet PCs, and notebook PCs, downsizing and light-weighting of which have been demanded.

The touch panel adopts any of various systems such as a resistive system, a surface acoustic wave system, an infrared system, an electromagnetic induction system, and a capacitive system in accordance with its intended use. For the purpose of enabling simultaneous detection of a plurality of positions, in recent years, the touch panel based on the capacitive system has been adopted for smartphones, tablet PCs, and the like.

In the touch panel based on the capacitive system, two perpendicular transparent conductive layers are provided on both front and back surfaces of a transparent dielectric, and when an operator brings a conductor such as a finger into contact with the touch panel, a change in capacitance of an electrode at a contact position can be detected on the basis of two lines of electrodes, i.e., row and column electrodes. Thus, the contact position can be precisely determined. In order to form the transparent conductive layers, a transparent substrate is required to have heat resistance enough to endure high temperature during formation of the transparent conductive layers. In general, a glass substrate is desirably used as the transparent substrate. In addition, in order to achieve downsizing and light-weighting of the touch panel device, thinning of the glass substrate to be used for the touch panel is desired. Patent Literature 1 below describes that when film-forming treatment is performed on a glass film having a thickness of 200 μm or less, the glass film is supported with a supporting glass.

Meanwhile, in addition to the functional aspects such as downsizing and light-weighting of the device, in recent years, there has been a demand for the device mounted with the touch panel to have novel property in design such as harmony with its installation space or cool appearance. Although many of the related-art display devices assume flat surface shapes, in order to attain a satisfactory degree of freedom in design, a display device assuming a curved shape has been demanded, and a touch panel curved so as to fit the display device has also been demanded as described in Patent Literature 2 below. In Patent Literature 2 below, the curved touch panel is mounted onto a surface of a liquid crystal display device having a curved shape and a protective sheet is provided on its surface.

CITATION LIST

Patent Literature 1: JP 2011-184284 A
Patent Literature 2: JP 2012-133428 A

SUMMARY OF INVENTION

Technical Problem

In order to achieve downsizing and light-weighting of a touch panel device, thinning of a glass substrate to be used for a touch panel is desired as described above. However, glass is a brittle material, and hence when the glass substrate is thinned, the glass substrate may be easily broken. A possible approach to solving this problem is the use of a surface protective sheet made of chemically tempered glass as described in Patent Literature 2.

However, in the case of adopting the chemically tempered glass described in Patent Literature 2, there has occurred a problem in that the tempered glass is as thick as about 1 mm, which prevents the achievement of downsizing and light-weighting. In addition, there has also been a problem in that the glass sheet having a thickness of 1 mm lacks flexibility, which necessitates thermal processing in the forming of a curved surface, and moreover, a chemical tempering step is also required, resulting in an increase in cost.

The present invention has been made with a view to solving the problems of the related art as described above, and an object of the present invention is to provide a glass film laminate for a touch panel having a curved surface shape, which is light-weighted and has durability, a manufacturing method therefor, and a touch panel.

Solution to Problem

According to one embodiment of the present invention, which is devised to achieve the above-mentioned object, there is provided a glass film laminate for a touch panel, comprising a laminate structure of at least three layers comprising: glass films; and a transparent adhesive layer, in which: both outermost layers of the glass film laminate for a touch panel each comprise one of the glass films; the glass films each have a thickness of 200 μm or less; an outer surface of one of both the outermost layers assumes a curved concave surface; an outer surface of another of both the outermost layers assumes a curved convex surface; the curved concave surface has formed therein a compressive stress layer; and in which the carved convex surface has formed therein a tensile stress layer.

The glass film laminate for a touch panel having the above-mentioned construction may comprise a five-layer structure comprising: two layers of the glass films respectively comprised in both the outermost layers; one layer of a conductive glass film being interposed between the two layers of the glass films and having a transparent conductive layer formed on each of both surfaces thereof; and two layers of the transparent adhesive layer for respectively bonding the two layers of the glass films respectively comprised in both the outermost layers onto the one layer of the conductive glass film.

In the glass film laminate for a touch panel having the above-mentioned construction, it is preferred that the transparent adhesive layer have formed therein a compressive stress layer.

In the glass film laminate for a touch panel having the above-mentioned construction, it is preferred that the glass film laminate for a touch panel satisfy the following relationship:

$$0.01 \leq h/L \leq 1/\pi$$

where L represents a length of the glass film laminate for a touch panel in its longitudinal direction and h represents a maximum clearance distance between a flat surface and the curved concave surface in a case where the glass film laminate for a touch panel is placed on the flat surface so that the curved concave surface serves as a bottom surface.

According to one embodiment of the present invention, which is devised to achieve the above-mentioned object, there is provided a touch panel, comprising: the glass film laminate for a touch panel having the above-mentioned construction; and a display device provided on the curved convex surface side of the glass film laminate for a touch panel.

According to one embodiment of the present invention, which is devised to achieve the above-mentioned object, there is provided a manufacturing method for a glass film, laminate for a touch panel, the glass film laminate for a touch panel comprising a laminate structure of at least three layers comprising: glass films; and a transparent adhesive layer, the manufacturing method comprising: laminating the glass films and the transparent adhesive layer, the transparent adhesive layer being in a non-adhesive state, on a flat surface to produce a temporary laminate; holding the temporary laminate on a curving jig to bring the temporary laminate into a curved state; performing, under the curved state, treatment for causing the transparent adhesive layer to exhibit an adhesive force to fix the glass films and the transparent adhesive layer together; and removing the carving jig.

In the manufacturing method for a glass film laminate for a touch panel having the above-mentioned construction, the treatment for causing the transparent adhesive layer to exhibit an adhesive force comprises heat treatment at a temperature equal to or lower than a strain point of each of the glass films.

Advantageous Effects of Invention

According to the present invention, light-weighting of the glass film laminate for a touch panel can be achieved through the use of the glass films each having a thickness of 200 μm or less. The outer surface of one of both the outermost layers assumes the curved concave surface, and the outer surface of the other assumes the curved convex surface. Thus, the curved glass film laminate for a touch panel can be provided. In addition, the formation of the compressive stress layer in the curved concave surface improves the durability of the curved concave surface. Thus, the glass film laminate for a touch panel can provide high durability when used to manufacture a touch panel with the curved concave surface being on an operation side. In addition, the glass film laminate for a touch panel itself is curved, and hence a process for its incorporation is facilitated as compared to the case where a glass film, laminate having a flat sheet shape is curved by an external force and incorporated into a device.

According to one preferred embodiment of the present invention, the conductive glass film having the transparent, conductive layer formed on each of both surfaces thereof is used. According to this embodiment, a touch panel that allows wiring to be compactly handled can be produced.

According to one preferred embodiment of the present invention, the transparent adhesive layer has formed therein the compressive stress layer. According to this embodiment, the compressive stress layer can be satisfactorily formed on the curved concave surface side of the glass film laminate for a touch panel. In addition, the durability of the glass film laminate for a touch panel can be improved.

According to one preferred embodiment of the present invention, the degree of curvature satisfies the relationship of $0.01 \leq h/L \leq 1/\pi$. According to this embodiment, the glass film laminate for a touch panel can improve operability for an operator when used to produce a touch panel.

According to one preferred embodiment of the present invention, the display device is provided on the curved convex surface side. According to this embodiment, when the glass film laminate for a touch panel is mounted onto the display device to produce a touch panel, the curved convex surface side, on which the tensile stress layer is formed, is not touched by an operator. Thus, the glass film laminate for a touch panel can be prevented from being broken from the curved convex surface side. In addition, the curved concave surface side serves as an operation surface. Accordingly, a distance over which a finger or the like is moved during operation can be reduced and the need to move a point of support for the operation is reduced.

According to one preferred embodiment of the present invention, the glass film laminate for a touch panel is produced by performing, under the curved state, the treatment for causing the transparent adhesive layer to exhibit an adhesive force to fix the glass films and the transparent adhesive layer together. According to this embodiment, the glass film laminate for a touch panel can be produced through a simple process without requiring thermal bending processing for glass.

According to one preferred embodiment of the present invention, the temperature at the time of lamination is equal to or lower than the strain point of each of the glass films. According to this embodiment, even when the glass films and the transparent adhesive layer are fixed together on the curving jig, the bending compressive stress applied to the glass film is not relaxed. Accordingly, even when the glass film laminate for a touch panel is produced, the compressive stress layer can be formed on the curved concave surface side. In addition, because the temperature of the heating is equal to or lower than the strain point of each of the glass films, the required quantity of heat can be reduced as compared to thermal bending processing involving heating to a temperature equal to or higher than the softening point of each of the glass films.

DESCRIPTION OF EMBODIMENTS

A glass film laminate for a touch panel according to a preferred embodiment of the present invention is described below with reference to the drawings. It should be noted that in FIG. 1, FIG. 3, FIG. 4, FIG. 5, and FIG. 6, hatching is omitted, for the sake of convenience.

Figure 1:
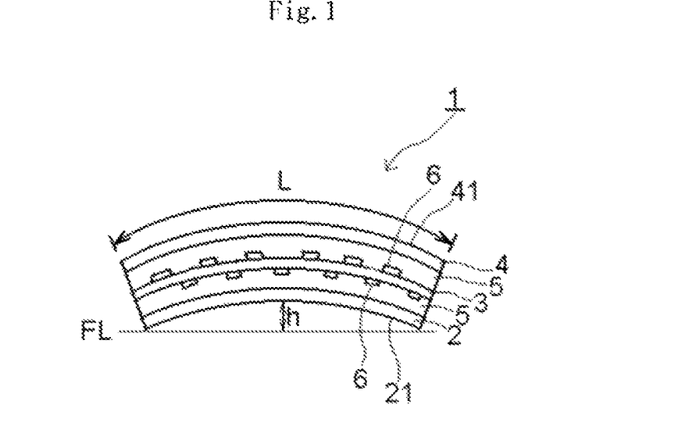
FIG. 1 is a cross-sectional view of a glass film laminate for a touch panel according to the present invention.

As illustrated in FIG. 1, a glass film laminate (1) for a touch panel according to the present invention comprises a first glass film (2), a second glass film (3), a third glass film (4), and two transparent adhesive layers (5). The first and third glass films (2), (4) form both outermost layers. The second glass film (3) has a transparent conductive layer (6) formed on each of both surfaces thereof. The glass film laminate (1) for a touch panel itself assumes a curved state without the application of an external force, in which a curved concave surface (21) and a curved convex surface (41) are formed. The curved concave surface (21) has formed therein a compressive stress layer, and the curved convex surface (41) has formed therein a tensile stress layer. In other words, the curved concave surface (21) has applied thereto a compressive stress, and the curved convex surface (41) has applied thereto a tensile stress. It should be noted that the glass film laminate (1) for a touch panel according to this embodiment is curved only in the horizontal direction of FIG. 1, and is not curved in a direction perpendicular to the drawing sheet.

As each of the first, second, and third glass films (2), (3), (4), silicate glass is used, silica glass, borosilicate glass, soda lime glass, or aluminosilicate glass is preferably used, and alkali-free glass is most preferably used. The alkali-free glass can be used as each of the glass films (2), (3), (4) to improve the transparency of the glass film laminate (1) for a touch panel, and when used for a touch panel, can prevent the color tone of an inside display device from being impaired. In addition, although glass is generally excellent in weather resistance, when an alkaline component is contained in the glass films (2), (3), (4), the so-called too-abundant soda phenomenon involving the removal of a cation from a surface occurs. As a result, each of the first, second, and third glass films (2), (3), (4) may become coarse in structure, and may have deteriorated light-transmissive property. In addition, the glass films (2), (3), (4) are curved as described later, and hence may be broken from a portion that has become coarse due to aging degradation. It should be noted that the alkali-free glass as used herein refers to glass substantially free of an alkaline component. (alkali metal oxide), and specifically refers to glass containing the alkaline component at a weight ratio of 1,000 ppm or less. In the present invention, the weight ratio of the alkaline component is preferably 500 ppm or less, more preferably 300 ppm or less.

The thickness of each of the first, second, and third glass films (2), (3), (4) is 200 μm or less, preferably from 5 μm to 200 μm, most preferably from 50 μm to 100 μm. With this, the smaller thicknesses of the glass films (2), (3), (4) enable light-weighting of the glass film laminate (1) for a touch panel, and can impart flexibility, which, allows the glass films (2), (3), (4) to be laminated with the intermediation of the transparent adhesive layers (5) while assuming a curved state as described later. When the thickness of each of the glass films (2), (3), (4) is less than 5 μm, the strength of each of the glass films (2), (3), (4) may tend to be insufficient, and depending on the number of glass films to be used, the flexibility of the glass film laminate (1) for a touch panel may be so high that the curved state of the glass film laminate (1) for a touch panel may be difficult to maintain. Meanwhile, when the thickness of each of the glass films (2), (3), (4) is more than 200 μm, the rigidity of the glass films (2), (3), (4) may exceed a stress due to expansion and contraction of the transparent adhesive layers (5), with the result that the glass film laminate (1) for a touch panel may return to a flat sheet state and the glass film laminate (1) for a touch panel may hardly assume a curved state.

Figure 2:
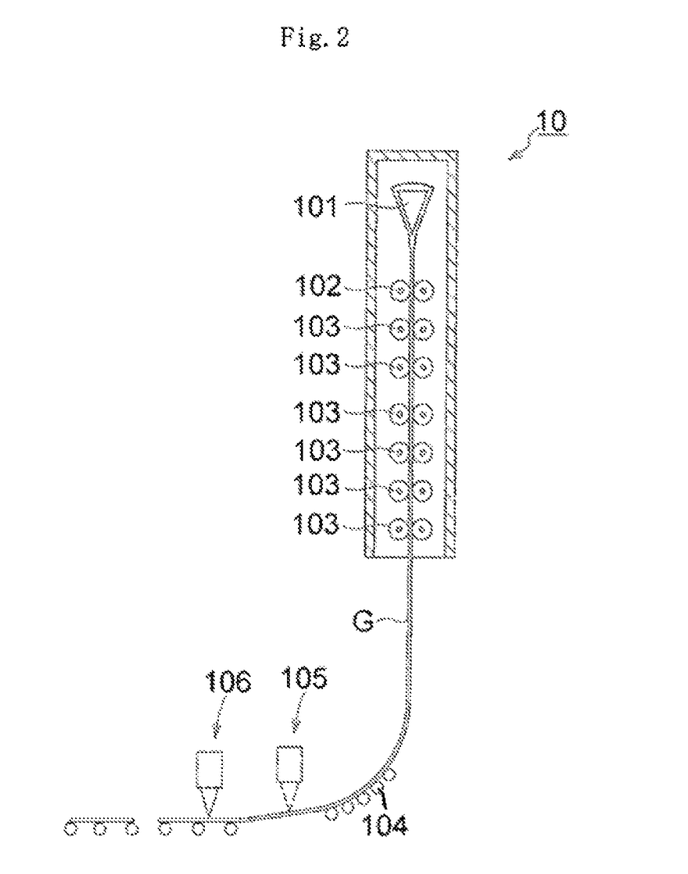
FIG. 2 illustrates an example of a manufacturing method for a glass film to be used in the present invention.

Each of the first, second, and third glass films (2), (3), (4) to be used in the present invention may be manufactured through the use of, for example, a known float method, roll-out method, slot down-draw method, or re-draw method, but is preferably formed by an overflow down-draw method as illustrated in FIG. 2. With this, glass films each having a thickness of 200 μm or less can be mass-produced at low cost. The glass films (2), (3), (4) that have been produced by the overflow down-draw method do not require thickness adjustment by polishing, grinding, chemical etching, or the like. In addition, the overflow down-draw method is a forming method that does not involve contact of both surfaces of a glass sheet with a forming member at the time of forming. Both surfaces (light-transmissive surfaces) of a glass sheet to be obtained are forged surfaces, and hence high surface quality can be obtained without polishing. Thus, adhesion to the transparent adhesive layers (5) can be improved.

FIG. 2 illustrates a manufacturing method (forming method) for a glass film based on the overflow down-draw method. Inside a forming device (10), a forming trough (101) assuming a wedge-like shape in cross section is arranged. Glass (molten glass), which is molten in a melting furnace (not shown), is fed into the forming trough (101) so that the molten glass overflows from a top part of the forming trough (101). Streams of the overflowing molten glass then flow along both side surfaces of the forming trough (101), and converge at a lower end of the forming trough (101) so that the molten glass starts to be formed into a glass film ribbon (G). Immediately after the streams of the molten glass converge at the lower end of the forming trough (101), the glass film ribbon (G) is drawn downward by cooling rollers (102) while being restricted from contracting in its width direction. Thus, the glass film ribbon (G) is thinned to a predetermined thickness. Next, the glass film ribbon (G) thinned to the predetermined thickness is delivered by rollers (103) and annealed in an annealing furnace (annealer) so that a thermal strain of the glass film ribbon (G) is eliminated. In this manner, the glass film ribbon (G) thus annealed is sufficiently cooled down to about room temperature. The moving direction of the glass film ribbon (G) having passed through the annealing furnace is changed by curving assist rollers (104) from a vertical direction to a horizontal direction, and then unnecessary portions present in both end portions of the glass film ribbon (G) in its width direction (portions brought into contact with the cooling rollers (102), the rollers (103), or the like) are cut off along its longitudinal direction with a first cutting device (105). After that, the glass film ribbon (G) is cut along its width direction with a second cutting device (106) into pieces each having a predetermined length. Thus, the glass films (2), (3), (4) to be used in the present invention can be obtained. It should be noted that the glass films (2), (3), (4) may be produced by cutting the glass film ribbon (G) along its width direction with the second cutting device (106) into pieces each having the predetermined length and then cutting and removing the unnecessary portions of the resultant with the first cutting device (105). In addition, a method of producing the glass film (2), (3), (4) as a single sheet has been described in connection with the above-mentioned forming device (10), but the production method is not limited thereto. After the unnecessary portions have been cut off with the first cutting device (105), the glass film ribbon (G) may be rolled into a roll shape with the intermediation of inserting paper or the like to produce a glass roll without being cut in its width direction, and a film-forming step to be described later may be performed by the so-called roll-to-roll process.

The transparent conductive layer (6) is a layer to be formed to impart conductivity to the second glass film (3), which is a dielectric. Therefore, the second glass film (3) having the transparent conductive layer (6) on each of both front and back surfaces thereof serves as a conductive glass film. As the transparent conductive layer (6), there may be used a metal thin film of gold, silver, aluminum, or the like, or an oxide thin film of tin-containing indium oxide (ITO), antimony-containing tin oxide, fluorine-containing tin oxide, aluminum-containing sine oxide, or the like. In particular, ITO is preferred because of its ability to be relatively easily formed into a film and to increase visible light transmittance.

The transparent conductive layer (6) may be formed through the use of an ion plating method, a sputtering method, a vacuum deposition method, or the like. In particular, a sputtering method is preferred because its use allows the formation of a dense film, which is excellent in abrasion resistance. In addition, in the present invention, the glass film (3) is used as a base material on which the transparent conductive layer (6) is to be formed, and hence the heat resistance of the base material is excellent as compared to the case of using a transparent resin sheet as the base material. Therefore, in the case where the transparent conductive layer (6) is formed on the second glass film (3), a film-forming step under a high-temperature environment at 150° C. or more can be performed and a film having a low volume resistivity can be formed. Thus, the thickness of the transparent conductive layer (6) can be reduced by about 50% as compared to the case of performing its formation at ordinary temperature.

The glass film laminate (1) for a touch panel according to the present invention is used for a touch panel, and hence after the formation of the transparent conductive layer (6), a resist layer (not shown) is formed. Next, an etching step of patterning the transparent conductive layer (6) through the overlying resist layer that has been patterned is performed using an etching solution such as hydrochloric acid. Next, a peeling step of peeling the resist layer from the transparent conductive layer (6) is performed using a peeling solution such as KOH. As a result, the transparent conductive layer (6) corresponding to lines of transparent electrodes is formed on each of both front and back surfaces of the second glass film (3).

After the patterning of the transparent conductive layer (6), the transparent adhesive layers (5) are fixed under a curved state as described later. Thus, the glass film laminate (1) for a touch panel, is produced. A material for the transparent adhesive layer (5) is not particularly limited, and there may be used a double-sided, pressure-sensitive adhesive sheet, a thermoplastic adhesive sheet, a thermal cross-linking adhesive sheet, an energy curable liquid adhesive, or the like. An optically transparent pressure-sensitive adhesive sheet, EVA, TPO, PVB, an ionoplast resin, an acrylic thermoplastic adhesive sheet, an ultraviolet curable adhesive, a thermosetting adhesive, a cold setting adhesive, or the like may be used for bonding. In the case of using an adhesive, it is preferred to use an adhesive that becomes transparent after bonding. The thickness of the transparent adhesive layer (5) is preferably from 5 to 500 µm.

The glass film laminate (1) for a touch panel according to the present invention itself assumes a curved shape without, the application of an external force such as a bending stress. Thus, the outer surface of one of the outermost layers (outer surface of the first glass film (2)) assumes the curved concave surface (21), and the outer surface of the other (outer surface of the third glass film (4)) assumes the curved convex surface (41). In addition, the curved concave surface (21) has formed therein a compressive stress layer, and the curved convex surface (41) has formed therein a tensile stress layer.

The compressive stress layer to be formed in the curved concave surface (21) preferably has a compressive stress value of from 1 MPa to 100 MPa. Meanwhile, the tensile stress layer to be formed in the curved convex surface (41) preferably has a low tensile stress value, and the stress value is preferably such that the glass film laminate for a touch panel is not broken.

In the glass film laminate (1) for a touch panel according to the present invention, the transparent adhesive layers (5) each preferably have formed, therein a compressive stress layer. The compressive stress present in each of the transparent adhesive layers (5) can hold the curved state against a force acting to cause the glass film (2) to return to its original flat sheet state, can satisfactorily form the compressive stress layer in the curved concave surface (21), and can improve the durability of each of the transparent adhesive layers (5). For example, as a method of forming the compressive stress layer in the curved concave surface (21), it is conceivable to produce the glass film laminate for a touch panel in a flat sheet state and to curve the glass film laminate during the production of a touch panel. In this case, the glass film laminate is mounted in a touch panel under a state in which an external force is constantly applied thereto. Consequently, handling at the time of the mounting may become difficult, and the durability of the touch panel may be reduced. In addition, in the case of curving the glass film laminate for a touch panel by applying an external force thereto, a tensile stress layer is formed in each of the transparent adhesive layers (5). In this case, an elastic material like a resin, when maintained under a state in which a tensile stress is constantly applied thereto, may be partially ruptured due to aging degradation, and the partial rupture may cause a reduction in sealing property.

The glass film laminate (1) for a touch panel according to the present invention preferably satisfies the following relationship:

$$0.01 \le h/L \le 1/\pi$$

where, as illustrated in FIG. 1, L represents the length of the glass film laminate (1) for a touch panel in its longitudinal direction and h represents the maximum clearance distance between a flat surface (FL) and the curved concave surface (21) in the case where the glass film laminate for a touch panel is placed on the flat surface (FL) so that the curved concave surface (21) serves as a bottom surface. With this, when a touch panel is produced, the resultant touch panel can have high durability and good operability. When h/L is less than 0.01, the compressive stress layer to be formed in the curved concave surface (21) tends to have a small compressive stress value. When h/L is more than 1/π, a touch panel to be produced may have deteriorated operability because of an increased range of movement of a wrist or an arm during operation.

Figure 3:
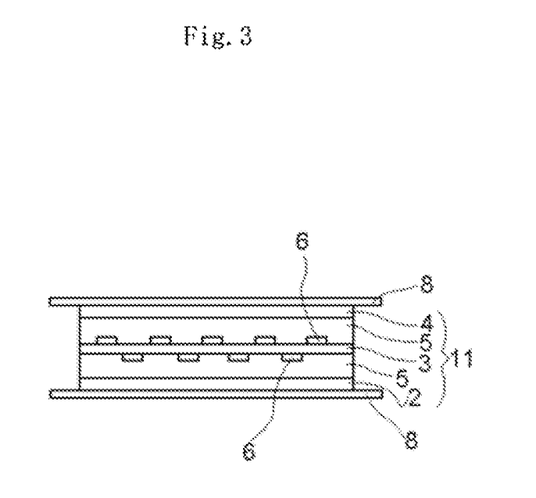
FIG. 3 is a cross-sectional view in which a release sheet is provided on each of both surfaces of a temporary laminate.
Figure 4:
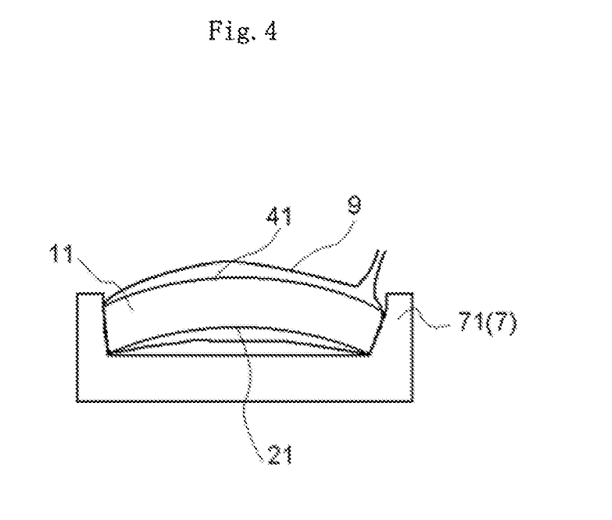
FIG. 4 is a cross-sectional view illustrating a first manufacturing method for the glass film laminate for a touch panel according to the present invention.

FIG. 3 and FIG. 4 illustrate a first manufacturing method for the glass film laminate (1) for a touch panel according to the present invention.

The glass film laminate (1) for a touch panel, according to the present invention is manufactured as described below. As illustrated in FIG. 3, under a flat surface state, the first glass film (2), the transparent adhesive layer (5) in a non-adhesive state, the second glass film (3) having the transparent conductive layer (6) formed on each of both surfaces thereof, the transparent adhesive layer (5) in a non-adhesive state, and the third glass film (4) are laminated in the stated order to produce a temporary laminate (11), and the front and back surfaces of the temporary laminate (11) are sandwiched between release sheets (8). Next, as illustrated in FIG. 4, the temporary laminate (11), together with the release sheets (8), is enveloped in a vacuum bag (9), and the resultant is supported in a short side-supporting curving jig (71) (curving jig (7)) for supporting opposing short sides, to thereby curve the temporary laminate (11). Thus, the compressive stress layer is formed in the curved concave surface (21), and the tensile stress layer is formed in the curved convex surface (41). It should be noted that in the illustration of FIG. 4, the release sheets (8) are omitted. After that, the pressure in the vacuum bag (9) is reduced and kept at a predetermined pressure for a given period of time, to thereby perform preliminary pressure bonding of the temporary laminate (11). After that, heating is performed in an electric furnace (not shown) at a temperature equal to or lower than the strain point of each of the glass films (2), (3), (4) for a given period of time to soften the transparent adhesive layers (5), to thereby allow each of the transparent adhesive layers (5) to exhibit an adhesive force. As a result, the first glass film (2), the transparent adhesive layer (5), the second glass film (3), the transparent adhesive layer (5), and the third glass film (4) are fixed together. After that, the temperature is lowered to ordinary temperature, and the resultant is removed from the curving jig (7) and taken out of the vacuum bag (9), followed by the removal of the release sheets (8). Thus, the glass film laminate (1) for a touch panel is obtained.

When the manufacturing method illustrated in FIG. 3 and FIG. 4 is used, the transparent adhesive layers (5) are preferably free of pressure-sensitive adhesiveness at ordinary temperature in order to facilitate the curving of the temporary laminate (11) with the curving jig (7).

The release sheets (8) are preferably slightly larger than the temporary laminate (11). In other words, the entire periphery of each of the release sheets (8) preferably projects from the temporary laminate (11). In this case, the purpose is to prevent the following situation: when the temporary laminate (11) is heated to a temperature equal to or lower than the strain point, the softened transparent adhesive layers (5) may project from the temporary laminate (11) to be bonded to the curving jig (7) or the vacuum bag (9). It is preferred to use, as each of the release sheets (8), a resin sheet of a silicone, a fluororesin, or the like.

The heating temperature of the temporary laminate (11) in the treatment for causing each of the transparent adhesive layers (5) to exhibit an adhesive force is preferably equal to or lower than the strain point of each of the glass films. With this, even when the compressive stress layer is formed in the curved concave surface (21) with the curving jig (7) before the fixation of the respective glass films (2), (3), (4) and the respective transparent adhesive layers (5), the compressive stress is not relaxed at the time of the fixation, and hence the compressive stress layer can remain in the curved concave surface (21) even after the fixation. The heating temperature in the electric furnace (not shown) is preferably from 50 to 300° C., more preferably from 50° C. to 200° C., depending on the bonding temperature or each of the transparent adhesive layers (5) to be used and the heat resistance of each of the transparent adhesive layers (5). The heating time may be set to, for example, from 10 to 60 minutes, depending on the bonding time of each of the transparent adhesive layers (5) to be used. When a UV-curable resin or the like is used as each of the transparent adhesive layers (5), a UV irradiation step may be adopted instead of a heating step as the treatment for causing each of the transparent adhesive layers (5) to exhibit an adhesive force. In this case, the treatment for causing each of the transparent adhesive layers (5) to exhibit an adhesive force can be performed at ordinary temperature.

When the glass film laminate (1) for a touch panel is manufactured through the use of the first manufacturing method illustrated it FIG. 4, the curving jig (7) is not brought into contact with any of both surfaces, i.e., the curved concave surface (21) and the curved convex surface (41). Consequently, the curved concave surface (21) and the curved convex surface (41) each have excellent surface quality.

Figure 5:
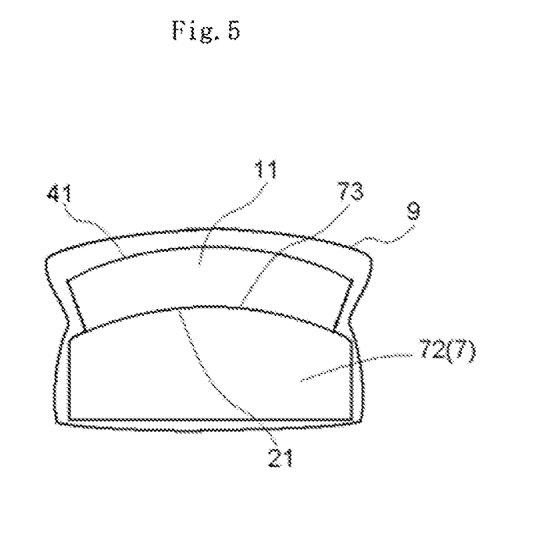
FIG. 5 is a cross-sectional view illustrating a second manufacturing method for the glass film laminate for a touch panel according to the present invention.

FIG. 5 illustrates a second manufacturing method for the glass film laminate (1) for a touch panel according to the present invention.

The second manufacturing method illustrated in FIG. 5 differs from the above-mentioned first manufacturing method illustrated in FIG. 4 in that a bottom surface-supporting curving jig (72) is used as the curving jig (7), and in that the temporary laminate (11) and the release sheets (8) (not shown) are enveloped in the vacuum bag (9) together with the bottom surface-supporting curving jig (72).

In the case of using the second manufacturing method illustrated in FIG. 5, the curvature of the curved concave surface (21) can be freely designed through the selection of the shape of a jig curved surface (73) of the bottom surface-supporting curving jig (72). For example, the curvature of the glass film laminate (1) for a touch panel can be changed by shaping each of both end portions of the bottom surface-supporting curving jig (72) so as to assume a curved surface and shaping its central portion into a substantially flat surface state.

In addition, unlike the first manufacturing method, it is possible to produce the glass film laminate (1) for a touch panel without producing the temporary laminate (11), by directly laminating and fixing together the first glass film (2), the transparent adhesive layer (5), the second glass film (3) having the transparent conductive layer (6) formed on each of both surfaces thereof, the transparent adhesive layer (5), and the third glass film (4) in the stated order directly on the bottom surface-supporting curving jig (72). In this case, a resin having pressure-sensitive adhesive property at ordinary temperature may be used as each of the transparent adhesive layers (5). Accordingly, unlike the first manufacturing method, it is possible to omit the treatment for causing each of the transparent adhesive layers (5) to exhibit an adhesive force such as the heating step or the UV irradiation step.

According to the present invention, through the use of the above-mentioned first manufacturing method or second manufacturing method, the glass film laminate (1) for a touch panel, which assumes a curved state, can be produced without performing thermal bending processing involving increasing the temperature to the softening point of each or the glass films (2), (3), (4). Hitherto, it has been necessary that a glass sheet be subjected to curving processing by thermal bending and then a transparent conductive film be formed. However, it is difficult to form, the transparent conductive film on a curved surface and perform precise patterning on the curved surface. Meanwhile, another approach may be to form, the transparent conductive film on the glass sheet, perform patterning, and then perform thermal bending processing involving increasing the temperature to the softening point of the glass sheet. In this case, however, the transparent conductive film may be altered in properties or disappear due to heat. In the present invention, the lamination and fixation steps can be performed at ordinary temperature or through heat treatment at a temperature equal to or lower than the strain point of each of the glass films, and hence a glass film, patterned with a precise transparent, conductive film can be used, for the glass film, laminate for a touch panel.

In addition, hitherto, the lamination process has been performed after the curving processing of a glass base material by thermal bending, and hence the curved concave surface has not had applied thereto a compressive stress due to bending. On the other hand, in the present invention, the lamination process is performed at ordinary temperature or during a heat treatment step at a temperature equal to or lower than the strain point, and hence the curved concave surface (21) has applied thereto a compressive stress due to bending, which can strengthen the curved concave surface side, which corresponds to a surface to be touched by an operator.

The present invention has been described in detail above. However, if should be appreciated that the present invention is not limited to the above-mentioned embodiments. For example, although the glass film laminate (1) for a touch panel having the five-layer structure "first glass film (2)/transparent adhesive layer (5)/second glass film (3)/transparent adhesive layer (5)/third glass film (4)" has been described with reference to FIG. 1, there may be adopted a three-layer structure in which the transparent conductive layer (6) is formed on the transparent adhesive layer (5) side of each of the first glass film (2) and the third glass film (4), and in which the second glass film (3) is omitted. In addition, a structure of six or more layers may be adopted as long as the outermost layers are the glass films.

The manufacturing method for the glass film laminate (1) for a touch panel according to the present invention is also not limited to the above-mentioned first and second manufacturing methods, and any manufacturing method may be used as long as the glass films and the transparent adhesive layer can be fixed together under a curved state.

Figure 6:
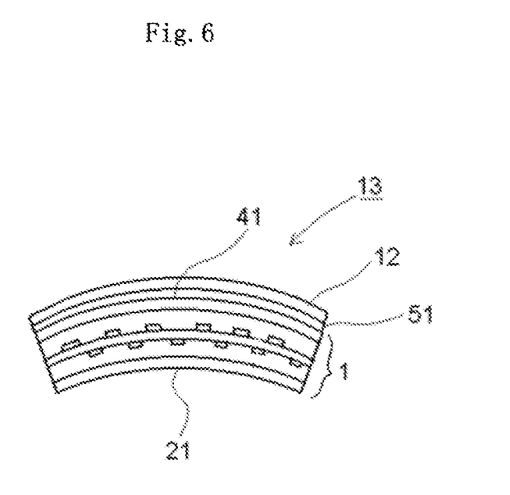
FIG. 6 is a cross-sectional view of a touch panel according to the present invention.

As illustrated, in FIG. 6, the glass film laminate (1) for a touch panel according to the present invention can be incorporated onto a display device (12), such as a liquid crystal display device or an OLED display device, which has been subjected to bending forming or has flexibility, with the intermediation of a transparent adhesive layer (51) on the curved convex surface (41) side, to thereby produce a touch panel (13). According to this construction, the curved concave surface (21), which corresponds to the side on which an operator performs operation, has improved durability by having applied thereto a compressive stress, and the curved convex surface (41) side having applied thereto a tensile stress can be protected by the transparent adhesive layer (51) and the display device (12).

INDUSTRIAL APPLICABILITY

The present invention can be suitably used for a touch panel to be used for a mobile phone, a smartphone, or a tablet or notebook PC.

REFERENCE SIGNS LIST 1 glass film laminate for touch panel
11 temporary laminate
13 touch panel
2 glass film
21 curved concave surface
3 glass film
4 glass film
41 curved convex surface
5 transparent adhesive layer
6 transparent conductive layer
7 curving jig
71 short side-supporting curving jig
72 bottom surface-supporting curving jig
8 release sheet
9 vacuum bag

The invention claimed is:

1. A glass film laminate for a touch panel, comprising a five-layer structure comprising:
    two glass film layers that form each of both outermost layers;
    one conductive glass film layer being interposed between the two glass film layers and having a transparent conductive layer formed on each of both surfaces thereof; and
    two transparent adhesive layers that bond the two glass film layers, respectively, to the conductive glass film layer,
    wherein the two glass film layers and the conductive glass film layer each comprises a glass film with a thickness of 200 μm or less,
    wherein an outer surface of one of both the outermost layers assumes a curved concave surface, while an outer surface of another of both the outermost layers assumes a curved convex surface,
    wherein the curved concave surface has formed therein a compressive stress layer, while the curved convex surface has formed therein a tensile stress layer, and
    wherein four surfaces of the two glass film layers and one conductive glass film layer are adhered to the two transparent adhesive layers, and the four surfaces are forged surfaces.

2. The glass film laminate for a touch panel according to claim 1, wherein the glass film laminate for a touch panel satisfies the following relationship:

$$0.01 \leq h/L \leq 1/\pi$$

where L represents a length of the glass film laminate for a touch panel in its longitudinal direction and h represents a maximum clearance distance between a flat surface and the curved concave surface in a case where the glass film laminate for a touch panel is placed on the flat surface so that the curved concave surface serves as a bottom surface.

3. A touch panel, comprising:
    the glass film laminate for a touch panel according to claim 1; and
    a display device provided on the curved convex surface side of the glass film laminate for a touch panel.

4. A manufacturing method for a glass film laminate for a touch panel, the glass film laminate comprising a five-layer structure comprising:
two glass film layers that form each of both outermost layers;
one conductive glass film layer being interposed between the two glass film layers and having a transparent conductive layer formed on each of both surfaces thereof; and
two transparent adhesive layers that bond the two glass film layers, respectively, to the conductive glass film layer,
wherein the two glass film layers and the conductive glass film layer each comprises a glass film with a thickness of 200 µm or less,
the manufacturing method comprising:
laminating, on a flat surface, two glass film layers, one conductive film layer, and two transparent adhesive layers being in a non-adhesive state to produce a temporary laminate;
in the production of the temporary laminate, bringing four surfaces of the two glass film layers and one conductive glass film layer into contact with the two transparent adhesive layers in a non-adhered state, wherein the four surfaces are forged surfaces;
holding the temporary laminate on a curving jig to bring the temporary laminate into a curved state;
performing, under the curved state, treatment for causing the transparent adhesive layers to exhibit an adhesive force to fix the two glass film layers and the conductive glass film layer together with the two transparent adhesive layers; and
then removing the curving jig so that
an outer surface of one of the outermost layers is formed into a curved concave surface, and
an outer surface of another of the outermost layers is formed into a curved convex surface.

5. The manufacturing method for a glass film laminate for a touch panel according to claim 4, wherein the treatment for causing the transparent adhesive layers to exhibit an adhesive force comprises heat treatment at a temperature equal to or lower than a strain point of each of the glass film layers.

* * * * *